July 9, 1940.   A. C. BRILL   2,207,000
AREA MEASURING MACHINE
Filed April 14, 1939
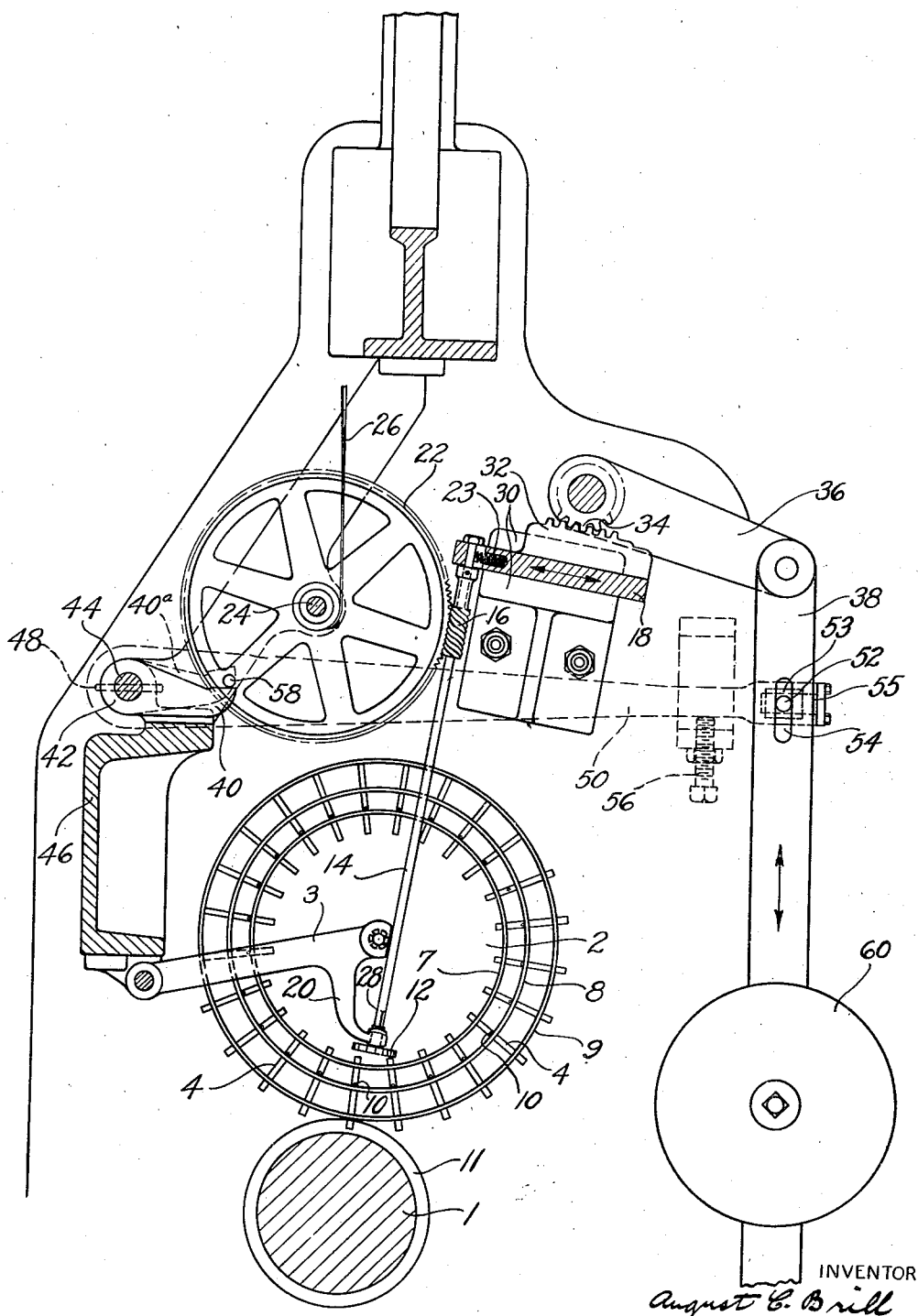
INVENTOR
August C. Brill
By his Attorney
Victor Cobb Patented July 9, 1940

2,207,000

UNITED STATES PATENT OFFICE 2,207,000

AREA MEASURING MACHINE

August C. Brill, Oberursel, near Frankfort-on-the-Main, Germany, assignor to The Turner Tanning Machinery Company, Portland, Maine, a corporation of Maine Application April 14, 1939, Serial No. 267,874
In Germany May 5, 1938

5 Claims. (Cl. 33—124)

This invention relates to area measuring machines and is illustrated as embodied in a measuring machine of the type disclosed in United States Letters Patents No. 1,046,655, granted December 10, 1912, upon an application of G. A. Schettler.

In the measuring machine of the said patent, the rotary movement of each work-contacting measuring element is transmitted to a totalizing mechanism through a worm and a cooperating worm gear. At the end of a measuring operation on a given piece of work, all of the worms and the worm gears are separated from each other to permit the worm gears to return to a position which corresponds to the initial or zero position of the indicating means and of the totalizing mechanism. In other words, the machine is conditioned for operation upon a succeeding piece of work. In the patented machine, it was found advantageous to move each of the worms away from its co-operating worm gear to permit movement of the worm gear to zero position. Upon return of the worms to meshing relation with respect to the worm gears, it is likely that some one or more of the worms and worm gears will clash somewhat and not mesh exactly, thereby requiring some movement of one or the other to perfect the meshing of such worm and worm gear. In some cases, this relative movement of the worm and worm gear results in an undesirable lost motion which tends to inaccuracy since all rotary motion of the worm gears is transmitted to the totalizing mechanism and thence to the indicating means. Even where the lost motion does not amount to much, there is bound to be a certain amount of wear which in itself is undesirable.

Accordingly, I have provided means for insuring perfect meshing of the worms and worm gears, in conditioning the machine for each successive measuring operation. Conveniently, this meshing takes place while the worm gears are returning to zero position and preferably during the very last part of such return movement.

In the illustrated construction, a plurality of latches is provided, one for each worm gear to co-operate with a pin on the latter, whereby the worm gear is stopped in its return movement just before it reaches zero position, the arrangement being such that the latch is retracted just as the worm is moved into contacting relation to its worm gear, whereby the slight additional rotary movement of the worm gear into its zero position, as the latch is withdrawn, insures proper meshing of the worm gear with the worm which is being presented in contacting relation thereto. Conveniently, all of the latches are controlled from the same treadle operated means by which the worms are moved away from the worm gears (to permit return of the latter to zero or initial position) and are subsequently returned into meshing (or contacting) relation to said worm gears.

With the above and other objects and advantages in view, the invention will now be described in detail in the specification and then pointed out more particularly in the appended claims.

In the drawing, the single figure is a vertical sectional view showing a measuring wheel with its connections to the totalizing mechanism.

In the illustrated machine, which is specially designed for the measurement of sheet material of irregular contour, such as a tanned hide or skin, there is provided a bed roll 1 over which the sheet material is fed through co-operation with a plurality of measuring wheels 2, the arrangement being such that the roll 1 is driven at a constant speed while the wheels 2 co-operate in the feeding of the sheet material by pressing the latter against the roll 1, the wheels rotating only when in contact with the material. Each measuring wheel is carried by a pivoted lever 3 so that, as the sheet material is passed between the wheels 2 and the bed roll 1, said wheels may rise according to the thickness of the material being measured. Mounted in each wheel 2 are pins 4 which are arranged radially and are capable of sliding movement toward and from the center of the wheel. As shown, the pins are carried by concentric rings 7, 8 and 9 on the wheel, each pin having a stud 10 projecting laterally therefrom into the space between the concentric rings 7 and 8, whereby the movement of each pin toward and from the center of the wheel is limited. As the wheel turns and each pin 4 approaches the bottom of the wheel, each such pin drops by gravity so that it will project into a slot 11 in the circumference of the bed roll 1 provided, of course, no sheet material is passing over the bed roll to keep the pin lifted. If sheet material is passing between the bed roll 1 and a number of the measuring wheels 2, pins in each of these wheels are lifted so that the upper end of each successive pin engages successively with a star wheel 12 to rotate the latter step by step.

Carrying the star wheel 12 is a spindle 14 which has fixedly secured thereto near its upper end a drop worm 16. As shown, the spindle 14 is rotatably mounted at its upper end in a slide member 18 and at its lower end in an arm 20 extended from the pivoted lever 3, the arrangement being such that the spindle 14 while rotatably mounted in the slide 18 is axially immovable with respect to the slide member. Since the number of threads on the drop worm 16 corresponds to the number of teeth on the star wheel 12, each step movement of the star wheel caused by one of the pins 4 produces a corresponding movement of a worm gear 22 which is in mesh with a drop worm 16. In order that the worms 16 may be pressed yieldingly against the worm gears 22 in the operation of being again meshed therewith, the upper end of each spindle 14 is received in a slot in the slide member 18 so that any worm 16 which does not mesh with its worm gear 22, during return of the worms toward meshing position, may yield against a coiled spring 23 carried in a socket in the slide member 18. As soon as the worm and worm gear are relatively positioned to mesh with each other, the spring 23 expands to effect such meshing of these elements.

As shown, the worm gear 22 has a hub portion 24 to which there is secured a steel band 26 adapted to be wound on the hub during rotation of the gear 22. All of the measuring wheels are connected by similar bands 26 to a system of levers (not shown) constituting a totalizing mechanism having suitable connections with means (not shown) for indicating the measurement of each piece of work. For a more complete disclosure of the measuring machine, particularly of the totalizing and indicating means, reference should be had to Patent No. 1,046,655, referred to above.

As indicated in the drawing, the star wheel 12 on the spindle 14 is movable in company with the pivoted lever 3 which carries the measuring wheel 2. For this reason the said star wheel is slidable along a feather 28 on the spindle 14 whereby the said star wheel, while movable lengthwise of the spindle 14, imparts rotation to the said spindle.

At the end of a measuring operation, the drop worms 16 are separated from the worm gears 22 to permit the latter to return to initial position preparatory to measuring another piece of work. For this reason the slide member 18, which serves as an actuator for moving the worms alternately into and out of operative relation with respect to the worm gears, is movable in a guideway 30, movement being imparted to the slide 18 by a rack 32 (rigid with the slide member 18) and a co-operating pinion 34, the pinion being rotated by a lever 36 which is arranged to be operated by a link 38 connected at its other end to a treadle lever (not shown). Upon depressing the treadle, the link 38 is moved upwardly thereby rotating the pinion 34 in a counterclockwise direction to effect retraction of the drop worm 16 from the worm gear 22, it being understood that all the drop worms 16 are actuated from the slide member or actuator 18 and are therefore simultaneously moved alternately into and out of relation to the worm gears 22 by suitable movements of the treadle.

Heretofore the worm gears 22 have been allowed to return to zero position before the drop worms 16 were moved into mesh therewith. In this improved mechanism, a series of latches 40 (which together form a rake 42) corresponding in number to the worm gears 22 are arranged oppositely to the latter on a shaft 44, the latter being rotatably mounted on a tie-bar or cross rail 46 of the machine frame. As shown, the latches 40 are secured to the shaft 44 by means of pins 48. The rake 42 is rocked by a lever 50 which is secured to the shaft 44. At its other end the lever 50 is provided with a pin 52, the latter being engaged in a slot 54 in the link 38. In its position of rest, the lever 50 rests upon an adjustable set screw 56. In the drawing, the latch 40 is shown, at 40a in dotted lines, in a raised position wherein each latch will engage a stop pin 58 on its associated worm gear 22. The raised position of the latch 40 is caused by lifting of the lever 50, through engagement of the pin 52 by the wall at the lower end of the slot 54 in the link 38 substantially at or near the end of the upward movement of the latter. The timing of this lifting of the lever 50 may be varied by adjustment of the set screw 56 to secure the desired results. The described engagement of the latch 40 and the stop pin 58 takes place almost at the end of the rotary return movement of each worm gear 22. Release of the treadle (not shown) is accompanied by movement of slide member 18 to the left in the drawing. This movement of the slide member 18 may be caused by a weight such as that shown at 60, or by a suitable spring. Because of the interconnected arrangement by which the lever 50, and hence the latch 40, is operated in timed relation to the slide member 18, the drop worm 16 is moved into cooperative or contacting relation to its worm gear 22 just as the latch is being moved to its lower or initial position. Hence the drop worm engages the worm gear while the latter has still a slight rotary movement to go whereby the meshing of the two is insured as the worm gears reach zero position, the worm gears 22 being held in said zero position by their worms 16. Preferably in the zero position of the worm gears 22, the pins 58 are spaced from the latches 40 which have dropped far enough for this purpose. Since the drop worms 16 are thus perfectly meshed with the worm gears 22, each rotation of the spindle 14 upon starting measurement of a fresh piece of work is immediately transmitted to the indicating means without lost motion. Hence the accuracy of the measuring operation is assured. Furthermore, the wear between the relatively movable drop worms and their associated worm gears is minimized.

Having described my invention, what I claim as new and desire to secure by Letters Patent of the United States is:

1. In a measuring machine having an indicating means, a plurality of measuring wheels, a corresponding number of worm gears having suitable connections with said indicating means, a plurality of spindles each having a worm secured thereto, said worms being arranged in meshing relation with respect to said worm gears, means associated with each measuring wheel to rotate the spindles during measurement of a work piece, an actuator for moving the worms into and out of meshing relation with respect to the worm gears, and means associated with said actuator and operating in timed relation therewith to stop each worm gear before it reaches zero position on its rotary return movement and then to cause relative movement between the worm gear and the worm while they are in contacting relation to insure proper meshing of these two elements.

2. In a measuring machine having an indicating means, a plurality of measuring wheels, a corresponding number of worm gears having suitable connections with said indicating means, a plurality of spindles each having a worm secured thereto, said worms being arranged in meshing relation with respect to said worm gears, means associated with each measuring wheel to rotate the spindles during measurement of a work piece, a slide member in which all of the spindles are rotatably mounted, said slide member being movable to separate the worms from their worm gears to permit the latter to rotate freely toward initial position preliminarily to another measuring operation, stop latches movable upwardly to arrest the worm gears before they reach zero position, and means to operate said slide member to move the worms again toward and into co-operative relation to their worm gears while the latter are in arrested position, the latches being subsequently withdrawn downwardly to permit relative movement between the worm gears and worms whereby perfect meshing of the latter is secured.

3. In a measuring machine having an indicating means, a plurality of measuring wheels, a corresponding number of worm gears having suitable connections with said indicating means, a plurality of spindles each having a worm secured thereto, said worms being arranged in meshing relation with respect to said worm gears, means associated with each measuring wheel to rotate the spindles during measurement of a work piece, a member in which all of the spindles are rotatably mounted, said member being movable to separate the worms from their worm gears to permit the latter to rotate freely toward initial position preliminarily to another measuring operation, a plurality of latches to arrest the worm gears before they reach zero position, and means to move said member to effect movement of the worms toward and into co-operative relation to the worm gears while the latches hold the worm gears in arrested position, said latches being subsequently movable to permit movement of the worm gears to zero position while they are in contact with said worms thereby insuring perfect meshing of the worms and worm gears.

4. In a measuring machine having a totalizing mechanism and an indicating means, a plurality of measuring wheels, a corresponding number of worm gears having suitable connections with said totalizing mechanism and indicating means, a plurality of spindles each having a worm secured thereto, said worms being arranged in meshing relation with respect to said worm gears, means associated with each measuring wheel to rotate the spindles during measurement of a work piece, a slide member in which all of the spindles are rotatably mounted, said slide member being movable to separate the worms from their worm gears to permit the latter to rotate freely toward initial position preliminarily to another measuring operation, a pin on each worm gear, a plurality of latches to engage the pins just before the worm gears reach zero position, and means to operate said slide member and said latches in timed relation to each other such that the worms are moved into co-operative relation to the worm gears while the latches are in contact with the pins on the worm gears, the latches being withdrawn from engagement with said pins to permit relative movement between the worm gears and worms whereby perfect meshing of the latter is secured.

5. In a measuring machine having a totalizing mechanism and an indicating means, a plurality of measuring wheels, a corresponding number of worm gears having suitable connections with said totalizing mechanism and indicating means, a plurality of spindles each having a worm secured thereto, said worms being arranged in meshing relation with respect to said worm gears, means associated with each measuring wheel to rotate the spindles during measurement of a work piece, a slide member in which all of the spindles are rotatably mounted, said slide member being movable to separate the worms from their worm gears to permit the latter to rotate freely toward initial position preliminarily to another measuring operation, a pin on each worm gear, a plurality of latches to engage the pins just before the worm gears reach zero position, a manually operated means to effect movement of said slide member, a lever having operative connections with said slide member to cause movements of said latches in timed relation to the movement of said slide member whereby the worms are moved into co-operative relation to the worm gears while the latches are in contact with said pins on the worm gears, the latches being subsequently retracted by movement of said lever to permit a slight further movement of the worm gears while the worms are in contact therewith, thereby insuring perfect meshing of the worms and worm gears.

AUGUST C. BRILL.